United States Patent
Hase et al.

(10) Patent No.: US 10,450,980 B2
(45) Date of Patent: Oct. 22, 2019

(54) CONTROL DEVICE FOR INTERNAL COMBUSTION ENGINE

(71) Applicant: NISSAN MOTOR CO., LTD., Yokohama-shi, Kanagawa (JP)

(72) Inventors: Takamitsu Hase, Isehara (JP); Kenichi Tsubaki, Shimotsuke (JP); Mitsuru Yoichi, Yokohama (JP)

(73) Assignee: NISSAN MOTOR CO., LTD., Tokohama-shi (JP)

( * ) Notice: Subject to any disclaimer, the term of this patent is extended or adjusted under 35 U.S.C. 154(b) by 858 days.

(21) Appl. No.: 14/410,996

(22) PCT Filed: May 31, 2013

(86) PCT No.: PCT/JP2013/065235
§ 371 (c)(1),
(2) Date: Dec. 23, 2014

(87) PCT Pub. No.: WO2014/002687
PCT Pub. Date: Jan. 3, 2014

(65) Prior Publication Data
US 2015/0204259 A1    Jul. 23, 2015

(30) Foreign Application Priority Data
Jun. 29, 2012    (JP) .................. 2012-146215

(51) Int. Cl.
*F02D 41/12*    (2006.01)
*B60W 10/06*    (2006.01)
(Continued)

(52) U.S. Cl.
CPC ........... *F02D 41/123* (2013.01); *B60W 10/06* (2013.01); *B60W 10/101* (2013.01);
(Continued)

(58) Field of Classification Search
CPC .. F02D 41/1498; F02D 41/123; F02D 41/126; F02M 3/055
(Continued)

(56) References Cited

U.S. PATENT DOCUMENTS 3,773,362 A * 11/1973 Lewis .................. B60T 8/1831
188/349
3,825,303 A * 7/1974 Yabuta .................... B60T 8/26
303/9.68
(Continued)

FOREIGN PATENT DOCUMENTS

JP         61049158 A   *   3/1986   ........... F02D 41/123
JP         S6149158 A   *   3/1986
JP         2009-019587 A    1/2009

*Primary Examiner* — Lindsay M Low
*Assistant Examiner* — Joshua Campbell
(74) *Attorney, Agent, or Firm* — Foley & Lardner LLP

(57) ABSTRACT

During a fuel cut-off control, if a vehicle deceleration rate becomes greater than a rapid deceleration determination value, which is calculated based on a rotational resistance of internal combustion engine 1, a vehicle is determined to be in a state of rapid deceleration. The rapid deceleration determination value is set to decrease as the rotational resistance of internal combustion engine 1 increases. The rotational resistance thereof increases as the vehicle speed decreases, and increases as a transmission gear ratio increases. Thereby, during decelerating on a high vehicle speed side, an erroneous determination of rapid deceleration due to a longitudinal vibration of the vehicle that occurs when the fuel cut-off control starts can be prevented, and during decelerating on a low vehicle speed side, a determination of rapid deceleration can be implemented to terminate the fuel cut-off control and thereby prevent the internal combustion engine 1 from being stopped.

20 Claims, 4 Drawing Sheets

(51) Int. Cl.
- *F02D 41/04* (2006.01)
- *F02D 17/02* (2006.01)
- *B60W 30/188* (2012.01)
- *B60W 10/101* (2012.01)
- *B60W 30/18* (2012.01)
- *F02M 3/055* (2006.01)
- *F02D 41/14* (2006.01)
- *F02D 41/02* (2006.01)
- *B60W 30/20* (2006.01)

(52) U.S. Cl.
CPC .. *B60W 30/1884* (2013.01); *B60W 30/18136* (2013.01); *F02D 17/02* (2013.01); *F02D 41/045* (2013.01); *F02D 41/126* (2013.01); *B60W 2030/18081* (2013.01); *B60W 2030/206* (2013.01); *B60W 2510/0647* (2013.01); *B60W 2510/0652* (2013.01); *B60W 2510/0657* (2013.01); *B60W 2510/1005* (2013.01); *B60W 2510/305* (2013.01); *B60W 2520/10* (2013.01); *B60W 2520/105* (2013.01); *F02D 41/0225* (2013.01); *F02D 41/1498* (2013.01); *F02D 2200/101* (2013.01); *F02D 2200/1012* (2013.01); *F02D 2200/501* (2013.01); *F02M 3/055* (2013.01)

(58) Field of Classification Search
USPC ................... 123/325–326, 332, 333, 198 DB
See application file for complete search history.

(56) References Cited

U.S. PATENT DOCUMENTS

| | | | |
|---|---|---|---|
| 4,039,061 A * | 8/1977 | Pruvot | F16H 61/21 |
| | | | 192/220 |
| 5,611,748 A * | 3/1997 | Kashiwabara | F16H 61/66259 |
| | | | 477/37 |
| 2004/0094120 A1* | 5/2004 | Kishibata | F02D 41/123 |
| | | | 123/325 |
| 2009/0018757 A1 | 1/2009 | Kobayashi et al. | |
| 2009/0248282 A1* | 10/2009 | Adachi | F02D 41/009 |
| | | | 701/112 |
| 2010/0242671 A1* | 9/2010 | Hatori | F16H 61/688 |
| | | | 74/665 F |
| 2011/0144891 A1* | 6/2011 | Nakamura | F02D 41/065 |
| | | | 701/104 |
| 2011/0184642 A1* | 7/2011 | Rotz | G01C 21/3469 |
| | | | 701/533 |
| 2014/0214250 A1* | 7/2014 | Murakami | E02F 9/2091 |
| | | | 701/22 |
| 2014/0236406 A1* | 8/2014 | Ishida | B60W 10/02 |
| | | | 701/22 |

* cited by examiner

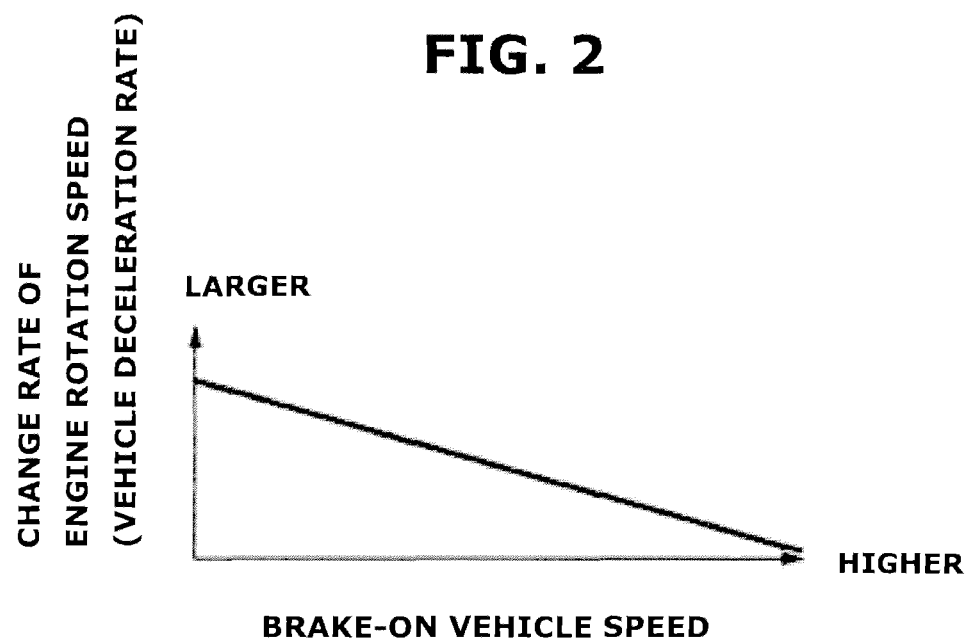
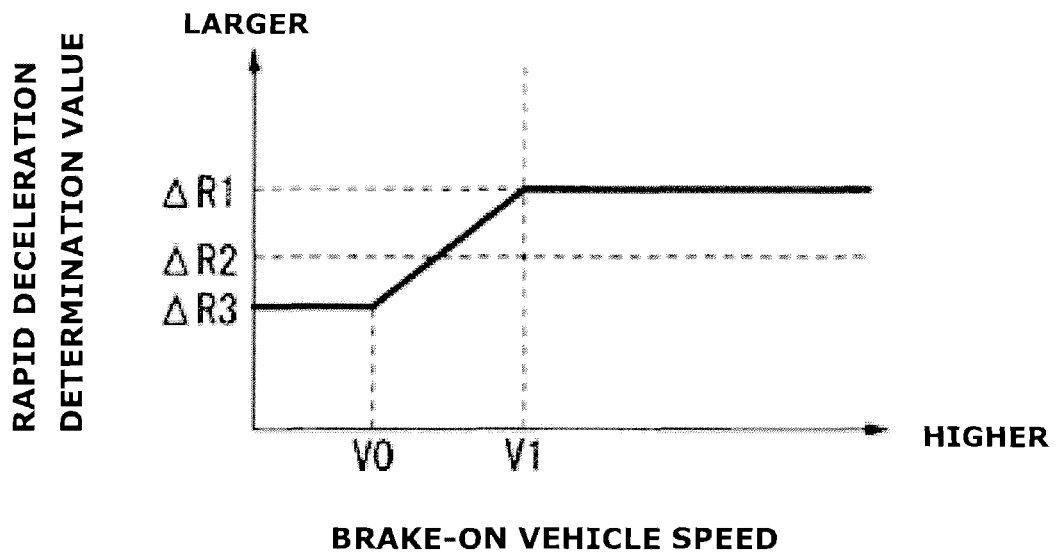

CONTROL DEVICE FOR INTERNAL COMBUSTION ENGINE

TECHNICAL FIELD

The present invention relates to an internal combustion engine control apparatus which is configured to implement a rapid deceleration determination while a vehicle is decelerating.

BACKGROUND ART

A patent document 1 discloses a technique: determining that a vehicle is in a rapid deceleration state, in response to a condition that a change rate of a vehicle speed becomes greater than a predetermined determination value while the vehicle is decelerating; and stopping a fuel cut-off control of cutting off fuel supply to an internal combustion engine, in response to a condition that the fuel cut-off control is being implemented.

In a situation where the fuel cut-off control is implemented, torque of the internal combustion engine shifts from normal rotation into reverse rotation when the fuel cut-off control starts. This causes rotational fluctuation in a power train system, and thereby causes the vehicle to vibrate in a longitudinal direction thereof. The longitudinal vibration causes the change rate of the vehicle speed to fluctuate.

However, according to patent document 1, when the change rate of the vehicle speed becomes greater due to longitudinal vibration occurring at start of the fuel cut-off control, it may be determined incorrectly that the vehicle is rapidly decelerating although it is not decelerating rapidly in actuality, because the longitudinal vibration is not taken into account.

PRIOR ART DOCUMENT(S)

Patent Document(s)

Patent Document 1: Japanese Patent Application Publication No. 2009-19587

SUMMARY OF THE INVENTION

An internal combustion engine control apparatus according to the present invention is configured to stop a fuel cut-off control in response to a determination that a deceleration state of a vehicle is rapid deceleration during the fuel cut-off control, wherein the internal combustion engine control apparatus is configured to determine that the deceleration state of the vehicle is rapid deceleration in response to a condition that a deceleration rate of the vehicle becomes greater than a rapid deceleration determination value which is calculated based on a rotational resistance of the internal combustion engine, and wherein the rapid deceleration determination value is set so as to decrease as the rotational resistance of the internal combustion engine increases.

According to the present invention, when the vehicle is decelerating on a high vehicle speed side where the fuel cut-off control can start, a rapid deceleration determination is performed in consideration of a longitudinal vibration occurring when the fuel cut-off control starts, and when the vehicle is decelerating on a low vehicle speed side where the fuel cut-off control cannot start, a rapid deceleration determination is performed in consideration of the longitudinal vibration. This allows to prevent an erroneous determination of rapid deceleration due to the longitudinal vibration, and prevent the internal combustion engine from being stopped during decelerating.

BRIEF DESCRIPTION OF THE DRAWINGS

FIG. 2 is a diagram schematically showing a correlation between a brake-on vehicle speed (i.e. a vehicle speed when a brake is turned on) and a change rate of an engine rotation speed.

FIG. 3 is a diagram schematically showing a correlation between the brake-on vehicle speed and a rapid deceleration determination value.

MODE(S) FOR CARRYING OUT THE INVENTION

Figure 1:
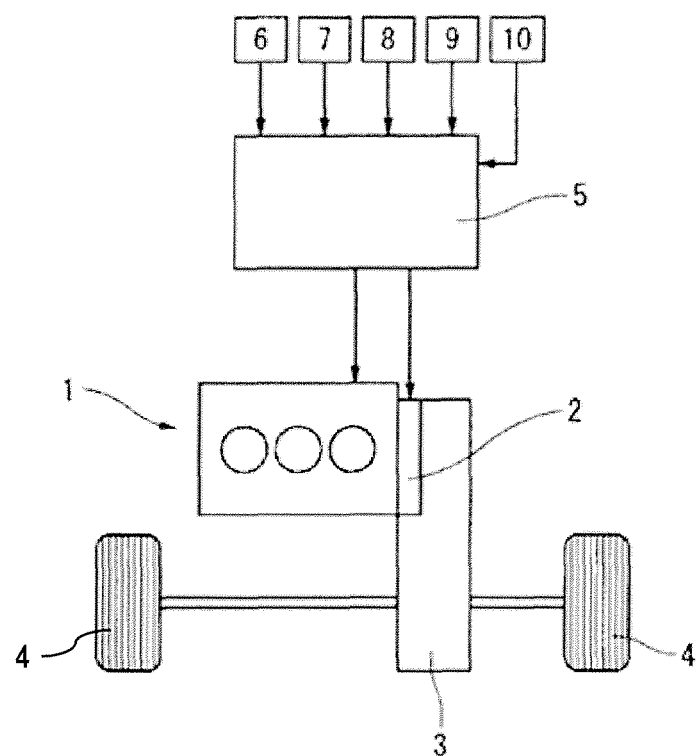
FIG. 1 is a system diagram showing overall configuration of an internal combustion engine to which the present invention is applied.

The following describes in detail an embodiment of the present invention with reference to the drawings. FIG. 1 is a system diagram showing overall configuration of an internal combustion engine 1 to which the present invention is applied.

Internal combustion engine 1 is mounted as a driving source in a vehicle such as an automobile, and is connected to a CVT 3 (CVT stands for Continuously Variable Transmission) through a torque converter 2. CVT 3 transmits power to driving wheels 4 and 4 through a final reduction gear not shown.

Torque converter 2 includes a lockup clutch not shown whose engagement/disengagement is controlled by a control unit 5. In response to a condition that a predetermined lockup engagement condition is satisfied, a lockup control is performed to engage the lockup clutch, wherein the lockup engagement condition is determined based on a vehicle speed and an engine rotation speed. Also, in response to a condition that a predetermined lockup disengagement condition is satisfied, the lockup control is terminated to disengage the lockup clutch, wherein the lockup disengagement condition is determined based on the vehicle speed and the engine rotation speed.

Control unit 5 receives input of signals of sensors such as a vehicle speed sensor 6, which detects a vehicle speed, an air flow meter 7, which detects an intake air quantity, a crank angle sensor 8, which detects a crank angle of a crankshaft not shown, an accelerator opening sensor 9, which detects an operating amount of an accelerator pedal not shown (accelerator opening degree), and a brake pedal sensor 10, which detects an on-off signal of a brake pedal not shown.

Based on those sensing signals, control unit 5 implements controls of ignition timing, air-fuel ratio and others of internal combustion engine 1, and implements a fuel cut-off control of cutting-off fuel supply to internal combustion engine 1, in response to a condition that a predetermined fuel cut-off condition is satisfied, and terminates the fuel cut-off control in response to a condition that a predetermined fuel cut-off cancelling condition is satisfied. For example, the fuel cut-off condition is satisfied when the accelerator opening degree is less than or equal to a predetermined opening degree, and the engine rotation speed is higher than or equal to a predetermined fuel cut-off rotation speed, and the vehicle speed is higher than or equal to a predetermined fuel cut-off speed. The fuel cut-off cancelling condition is satisfied when any one of the following conditions is satisfied: a condition that the accelerator opening degree is greater than or equal to the predetermined opening degree, and a condition that the engine rotation speed is lower than or equal to a predetermined fuel cut-off recovery rotation speed, and a condition that the vehicle speed is lower than or equal to a predetermined fuel cut-off recovery speed.

In response to a condition that the brake pedal is depressed (the brake is turned on) during the fuel cut-off control, it is determined whether or not the vehicle is rapidly decelerating, based on a deceleration rate of the vehicle and a rapid deceleration determination value, wherein the deceleration rate of the vehicle is a change rate of the vehicle speed or a change rate of the engine rotation speed, and wherein the rapid deceleration determination value is calculated based on the rotational resistance of internal combustion engine 1 depending on the vehicle speed and a transmission gear ratio.

When the fuel cut-off control starts, the longitudinal vibration occurs because torque of internal combustion engine 1 shifts from normal rotation into reverse rotation. Thereby it may be erroneously determined that the vehicle is rapidly decelerating, because the deceleration rate of the vehicle becomes greater due to the longitudinal vibration.

If the rapid deceleration determination value is provided with a margin (namely, set greater) in order to avoid the erroneous determination of rapid deceleration of the vehicle due to the longitudinal vibration, it takes a long time until the deceleration state of the vehicle has been determined as rapid deceleration in response to a condition that the vehicle decelerates rapidly, making it relatively highly possible that internal combustion engine 1 may be stopped.

In an operation region where the vehicle speed is high, the engine rotation speed decreases relatively slowly even when rapid deceleration of the vehicle actually occurs. Thereby, even if the rapid deceleration determination value is provided with a margin, internal combustion engine 1 is not stopped because the rapid deceleration determination is delayed. On the other hand, when the vehicle speed is low so that the fuel cut-off control is not started, the longitudinal vibration does not occur. Accordingly, it is unnecessary to add a margin to the rapid deceleration determination value. Unless the rapid deceleration determination is implemented promptly, internal combustion engine 1 may be stopped.

Since there is a correlation between the deceleration rate of the vehicle during decelerating and the rotational resistance of internal combustion engine 1, the deceleration rate of the vehicle increases as the rotational resistance of internal combustion engine 1 increases. The rotational resistance of internal combustion engine 1 increases as the vehicle speed decreases, and increases as the transmission gear ratio increases. Thereby, the possibility that internal combustion engine 1 stops increases as the rotational resistance of internal combustion engine 1 increases.

Accordingly, when the deceleration rate of the vehicle becomes greater than the rapid deceleration determination value during the fuel cut-off control, wherein the rapid deceleration determination value is calculated based on the rotational resistance of internal combustion engine 1, it is determined that the vehicle is rapidly decelerating. The rapid deceleration determination value is set so as to decrease as the rotational resistance of internal combustion engine 1 increases.

Since the vehicle speed and the transmission gear ratio are uniquely determined in a case that a transmission is a CVT, the deceleration rate of the vehicle increases as a brake-on vehicle speed (i.e. a vehicle speed when a brake is turned on) decreases as shown in FIG. 2. Accordingly, in the case that the transmission is a CVT, the rapid deceleration determination value is set so as to decrease as the brake-on vehicle speed decreases, as shown in FIG. 3.

Specifically, in the present embodiment, the rapid deceleration determination value is set to $\Delta R1$ in a first region where the brake-on vehicle speed is greater than or equal to V1 and the fuel cut-off control can be started, wherein $\Delta R1$ is set greater than $\Delta R2$, and wherein $\Delta R2$ is a deceleration rate of the vehicle (e.g., a change rate of rotation speed of an output shaft of CVT 3) while the longitudinal vibration is present. On the other hand, in a second region where the brake-on vehicle speed is lower than V1 and the fuel cut-off control cannot be started, the rapid deceleration determination value is set to $\Delta R3$ when the brake-on vehicle speed is lower than or equal to V0, wherein $\Delta R3$ is smaller than $\Delta R2$, and is set to increase as the brake-on vehicle speed increases from zero, and become equal to $\Delta R1$ as the brake-on vehicle speed is equal to V1, when the brake-on vehicle speed is between V0 and V1. The deceleration rate of the vehicle while the longitudinal vibration is present, $\Delta R2$, is set based on a value of the deceleration rate of the vehicle while a longitudinal vibration is present, which is predetermined experimentally or the like.

In the embodiment described above, the rapid deceleration determination value is set so as to change continuously depending on the vehicle speed. However, the rapid deceleration determination value may be set so as to change stepwise as the brake-on vehicle speed crosses V1. Specifically, the rapid deceleration determination value may be set to $\Delta R1$ in response to a condition that the brake-on vehicle speed is higher than or equal to V1, wherein $\Delta R1$ is a predetermined value greater than $\Delta R2$, and set to $\Delta R3$ in response to a condition that the brake-on vehicle speed is lower than V1, wherein $\Delta R3$ is a predetermined value smaller than $\Delta R2$.

Figure 4:
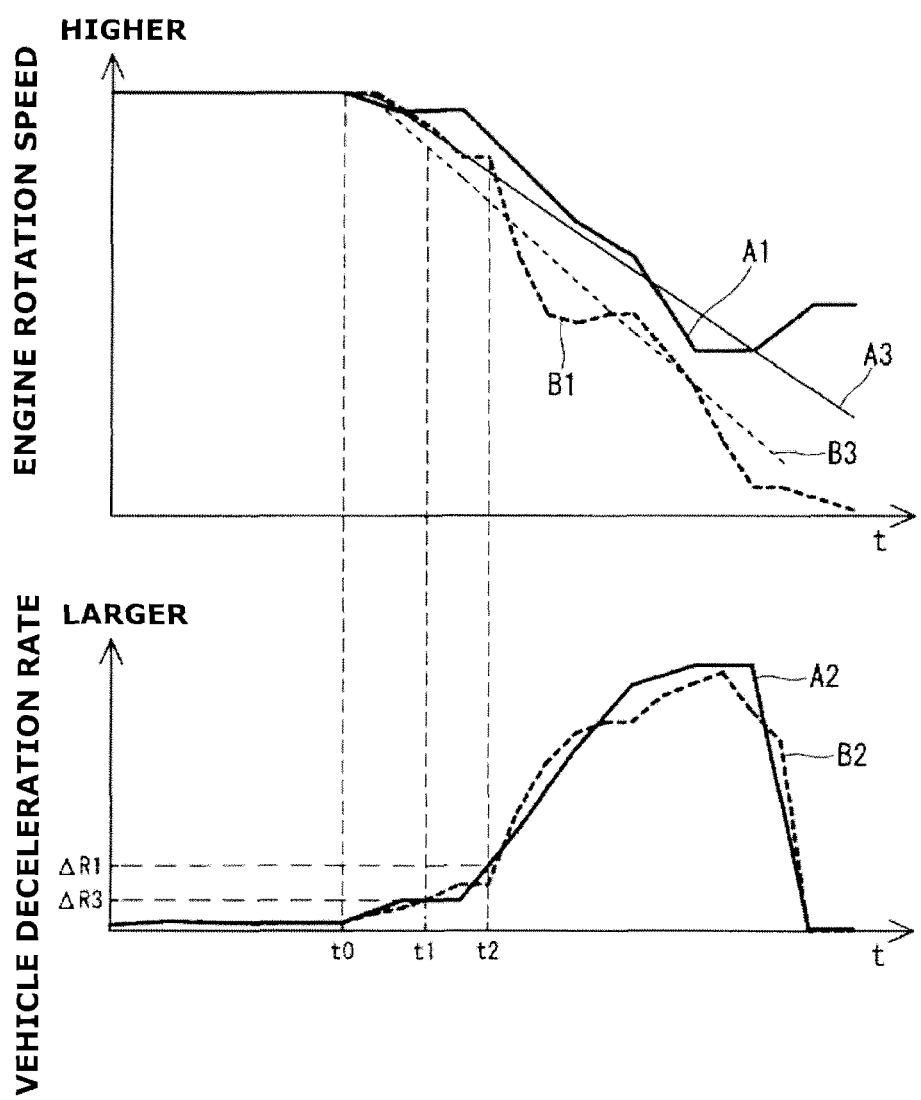
FIG. 4 is a timing chart showing rapid deceleration determinations under conditions that the engine rotation speed is common, and the brake-on vehicle speed is different.

FIG. 4 is a timing chart showing situations of rapid deceleration determination under conditions that the engine rotation speed is common, and the brake-on vehicle speed is different. As represented by solid lines in FIG. 4, characteristic lines A1 and A2 correspond to a condition that the brake-on vehicle speed is equal to Va greater than or equal to V1, and the rapid deceleration determination value is set to $\Delta R1$. As represented by broken lines in FIG. 4, characteristic lines B1 and B2 correspond to a condition that the brake-on vehicle speed is equal to Vb less than or equal to V0, and the rapid deceleration determination value is set to $\Delta R3$. As shown in FIG. 4, although the engine rotation speed is common when the brake is turned on (at time instant t0), the change rate of the engine rotation speed increases during decelerating as the brake-on vehicle speed decreases. Thereby, straight line B3 (broken line) has a greater gradient than straight line A3 (solid line), wherein straight line B3 indicates an overall trend of inclination of characteristic line B1, and wherein straight line A3 indicates an overall trend of inclination of characteristic line A1.

Since the rapid deceleration determination value is set so as to decrease as the brake-on vehicle speed decreases, the vehicle is determined at time instant t1 as rapidly decelerating in the case that the brake-on vehicle speed value is Vb, and is determined at time instant t2 as rapidly decelerating in the case that the brake-on vehicle speed value is Va. Thereby, the time instant when the vehicle is determined as rapidly decelerating becomes closer to the time instant when the brake is turned on (time instant t0), as the brake-on vehicle speed (at time instant t0) decreases.

In response to the determination that the vehicle is rapidly decelerating, the fuel cut-off control is terminated (fuel cut-off recovery), and if the lockup control is being implemented, the lockup clutch is then disengaged to terminate the lockup control.

Since the rapid deceleration determination value is set so as to decrease as the brake-on vehicle speed decreases, the rapid deceleration determination is performed in consideration of the longitudinal vibration occurring when the fuel cut-off control starts when the vehicle is decelerating on the high vehicle speed side where the fuel cut-off control can start, and on the other hand, the rapid deceleration determination is performed in no consideration of the longitudinal vibration when the vehicle is decelerating on the low vehicle speed side where the fuel cut-off control cannot start. Thereby, during decelerating on the high vehicle speed side, erroneous determination due to the longitudinal vibration can be prevented, and during decelerating on the low vehicle speed side, the rapid deceleration determination is implemented to terminate the fuel cut-off control and thereby prevent internal combustion engine 1 from being stopped.

Figure 5:
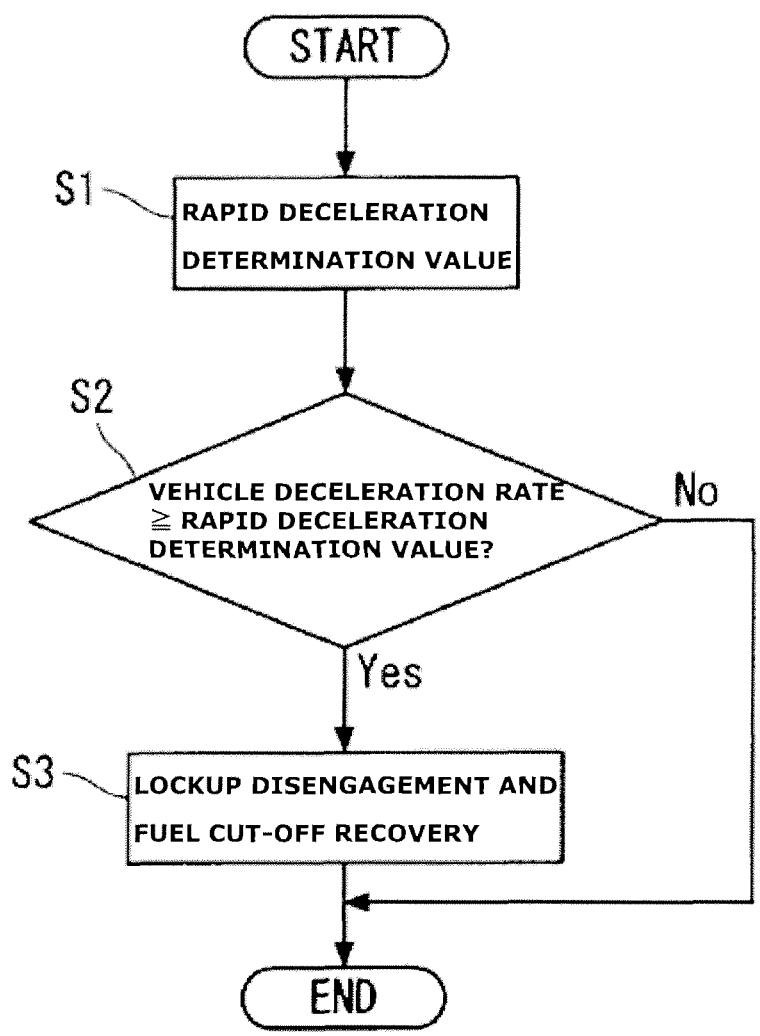
FIG. 5 is a flow chart showing a control flow of vehicle rapid deceleration determination.

FIG. 5 is a flow chart showing a control flow of the vehicle rapid deceleration determination in the embodiment.

At S1, the rapid deceleration determination value is calculated based on the rotational resistance of internal combustion engine 1. At S2, it is determined whether or not the deceleration rate of the vehicle is greater than the rapid deceleration determination value. When the deceleration rate of the vehicle is greater than the rapid deceleration determination value, the vehicle is determined as rapidly decelerating, and the process then proceeds to S3. At S3, the fuel cut-off control is terminated (fuel cut-off recovery), and the lockup clutch is disengaged, and the lockup control is terminated.

In the embodiment described above, the transmission is implemented by CVT 3, but may be implemented by an automatic transmission or a manual transmission.

In a case that the transmission is an automatic transmission, the rapid deceleration determination value is calculated depending on the rotational resistance calculated based on the vehicle speed and the transmission gear ratio. In this calculation, even when the vehicle speed is common, a calculated rotational resistance for a low gear position (having a greater transmission gear ratio) is greater than that for a high gear position.

In a case that the transmission is a manual transmission, the rapid deceleration determination value can be calculated based on the rotational resistance which is calculated depending on the vehicle speed and the transmission gear ratio, if the current transmission gear ratio can be detected by provision of a shift position detection means or the like.

The rapid deceleration determination value may be corrected depending on an auxiliary load of internal combustion engine 1. Specifically, the rapid deceleration determination value, which is calculated based on the rotational resistance of internal combustion engine 1, may be corrected so as to decrease as the auxiliary load increases. This allows to prevent more effectively the internal combustion engine 1 from being stopped due to a decrease of the vehicle speed during decelerating.

The invention claimed is:

1. An internal combustion engine control apparatus comprising:
an internal combustion engine mounted in a vehicle;
a fuel cut-off control means configured to implement a fuel cut-off control of cutting off fuel supply to the internal combustion engine; and
a deceleration state determination means configured to determine a deceleration state of the vehicle during the fuel cut-off control;
wherein the internal combustion engine control apparatus is configured to stop the fuel cut-off control in response to a determination that the deceleration state of the vehicle is rapid deceleration;
wherein the deceleration state determination means is configured to determine that the deceleration state of the vehicle is rapid deceleration, in response to a condition that a deceleration rate of the vehicle becomes greater than a rapid deceleration determination value, wherein the rapid deceleration determination value is calculated based on a rotational resistance of the internal combustion engine;
wherein the rotational resistance depends on a vehicle speed and a transmission gear ratio; and
wherein the rapid deceleration determination value is set so as to decrease as the rotational resistance of the internal combustion engine increases.

2. The internal combustion engine control apparatus as claimed in claim 1, wherein the rotational resistance increases as the vehicle speed decreases, and increases as a transmission gear ratio of a transmission mounted in the vehicle increases.

3. The internal combustion engine control apparatus as claimed in claim 1, wherein a continuously variable transmission is mounted in the vehicle, and the rotational resistance is set to depend on the vehicle speed.

4. The internal combustion engine control apparatus as claimed in claim 1, wherein the rapid deceleration determination value is corrected depending on an auxiliary load of the internal combustion engine.

5. The internal combustion engine control apparatus as claimed in claim 1, wherein the deceleration rate of the vehicle is a change rate of an engine rotation speed of the internal combustion engine or a change rate of the vehicle speed.

6. An internal combustion engine control apparatus comprising:
an internal combustion engine mounted in a vehicle;
a control unit configured to:
implement a fuel cut-off control of cutting off fuel supply to the internal combustion engine; and
determine a deceleration state of the vehicle during the fuel cut-off control;
wherein the internal combustion engine control apparatus is configured to stop the fuel cut-off control in response to a determination that the deceleration state of the vehicle is rapid deceleration;
wherein the control unit is configured to determine that the deceleration state of the vehicle is rapid deceleration, in response to a condition that a deceleration rate of the vehicle becomes greater than a rapid deceleration determination value, wherein the rapid deceleration determination value is calculated based on a rotational resistance of the internal combustion engine;
wherein the rotational resistance depends on a vehicle speed and a transmission gear ratio; and
wherein the rapid deceleration determination value is set so as to decrease as the rotational resistance of the internal combustion engine increases.

7. The internal combustion engine control apparatus as claimed in claim 6, wherein the rotational resistance increases as the vehicle speed decreases, and increases as a transmission gear ratio of a transmission mounted in the vehicle increases.

8. The internal combustion engine control apparatus as claimed in claim 6, wherein a continuously variable transmission is mounted in the vehicle, and the rotational resistance is set to depend on the vehicle speed.

9. The internal combustion engine control apparatus as claimed in claim 6, wherein the rapid deceleration determination value is corrected depending on an auxiliary load of the internal combustion engine.

10. The internal combustion engine control apparatus as claimed in claim 6, wherein the deceleration rate of the vehicle is a change rate of an engine rotation speed of the internal combustion engine or a change rate of the vehicle speed.

11. The internal combustion engine control apparatus as claimed in claim 1,
wherein the rapid deceleration determination value is set based on a brake-on vehicle speed, and
wherein the brake-on vehicle speed is a vehicle speed when a brake is turned on.

12. The internal combustion engine control apparatus as claimed in claim 11, wherein the rapid deceleration determination value is set to decrease as the brake-on vehicle speed decreases.

13. The internal combustion engine control apparatus as claimed in claim 11, wherein the rapid deceleration determination value is set to change in a stepwise manner with respect to the brake-on vehicle speed.

14. The internal combustion engine control apparatus as claimed in claim 11, wherein the rapid deceleration determination value is set to be constant in a region where the brake-on vehicle speed is above a predetermined value.

15. The internal combustion engine control apparatus as claimed in claim 11, wherein the rapid deceleration determination value is set to be constant in a region where the brake-on vehicle speed is below a predetermined value.

16. The internal combustion engine control apparatus as claimed in claim 6,
wherein the rapid deceleration determination value is set based on a brake-on vehicle speed, and
wherein the brake-on vehicle speed is a vehicle speed when a brake is turned on.

17. The internal combustion engine control apparatus as claimed in claim 16, wherein the rapid deceleration determination value is set to decrease as the brake-on vehicle speed decreases.

18. The internal combustion engine control apparatus as claimed in claim 16, wherein the rapid deceleration determination value is set to change in a stepwise manner with respect to the brake-on vehicle speed.

19. The internal combustion engine control apparatus as claimed in claim 16, wherein the rapid deceleration determination value is set to be constant in a region where the brake-on vehicle speed is above a predetermined value.

20. The internal combustion engine control apparatus as claimed in claim 16, wherein the rapid deceleration determination value is set to be constant in a region where the brake-on vehicle speed is below a predetermined value.

* * * * *